June 1, 1937.  J. W. LEIGHTON  2,082,250
THREADED BEARING CONNECTION
Filed Aug. 2, 1935
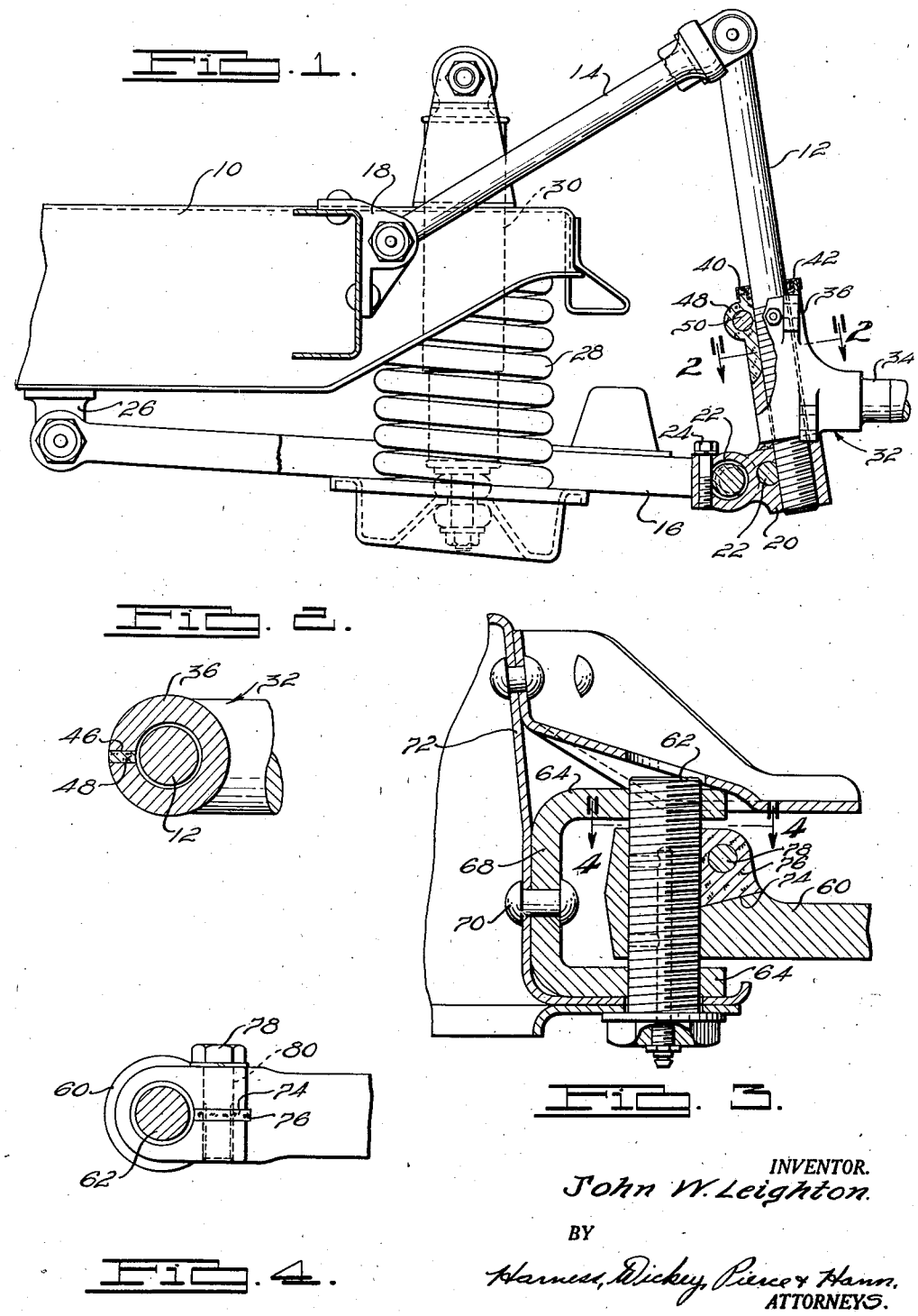
INVENTOR.
John W. Leighton.
BY
Harness, Dickey, Pierce & Hann.
ATTORNEYS.

Patented June 1, 1937

2,082,250

UNITED STATES PATENT OFFICE 2,082,250

THREADED BEARING CONNECTION

John W. Leighton, Port Huron, Mich.

Application August 2, 1935, Serial No. 34,337

2 Claims. (Cl. 287—93)

The present invention relates to bearing connections, and more particularly to adjustable bearing connections of the threaded type.

It is an object of the present invention to provide a threaded bearing connection which is readily adjustable to take up play in the operating parts.

It is a further object of the present invention to provide a threaded bearing connection embodying a threaded bearing member slotted at one side, and embodying a clamping device to restrict or enlarge the slot, to thereby adjust the bearing.

It is a further object of the present invention to provide a threaded bearing of the last mentioned type in which the slot is formed in a portion of the bearing member spaced from the portion through which load is transmitted through the bearing member.

It is a further object of the present invention to provide a threaded bearing connection embodying a slotted threaded bearing member, constructed to accommodate a gasket to prevent the escape of lubricant through the slot.

Other objects and advantages of the present invention appear in the following description and in the appended claims.

In the drawing, throughout the several views of which corresponding reference characters are used to designate corresponding parts, Figure 1 is a fragmentary view in front elevation of a threaded bearing connection embodying the present invention;

Figure 2 is a view taken along the line 2—2 of Figure 1;

Figure 3 is a fragmentary view in front elevation of a modified embodiment of the present invention; and Figure 4 is a view taken along the line 4—4 of Figure 3.

Threaded bearing connections have been found desirable in various applications, particularly in the automobile industry, because of the economy with which they may be manufactured and assembled, and the relative freedom of them from maintenance difficulties. It has been found desirable, however, to construct bearing connections of this character so that they may be readily adjusted to take up play and wear of the parts. The construction of the present invention whereby this adjustability is provided is applicable to various types of threaded bearing connections, but has been illustrated for convenience as applied to threaded bearing connections for the knuckle bracket of an automobile wheel suspension, and to a support for the tie rod mechanism of an automobile.

In the form illustrated, a threaded bearing connection comprises generally a pin or shaft provided with exterior threads which mate with a bearing member having corresponding internal threads. The bearing member is slotted throughout either all or a portion of its length. A suitable clamping device is provided to restrict or enlarge the slot to thereby adjust the inside dimensions of the bearing member. In further accordance with the present invention, the slot is formed in the bearing member at a point spaced from the region through which the load is normally transmitted through the connection. In this way, any tendency to form shoulders through wear, causing interference with the proper bearing action, is effectively avoided.

Referring particularly to Figures 1 and 2 of the drawing, an illustrative embodiment of the present invention comprises a vehicle frame 10 from which a king pin 12 may be suspended by an upper wishbone 14 and lower wishbone 16, in the manner described and claimed in the co-pending application of the present applicant, Serial No. 31,986, filed July 18, 1935. Briefly stated, the upper end of the upper wishbone 14 is pivotally connected to the upper end of king pin 12, and the lower end thereof is pivotally connected to a bracket 18 which is rigidly secured to frame 10 in any suitable manner. Simiarly, the outer end of the lower wishbone 16 is secured to a bracket 20, which is threaded onto the lower end of the king pin 12. A locking pin 22 is provided to prevent rotation between king pin 12 and bracket 20. The connection between wishbone 16 and bracket 20 embodies the eccentric element 22 and the adjusting stud 24, preferably provided to conveniently adjust the camber and caster of the wheel associated with king pin 12. The inner end of the lower wishbone 16 is pivotally connected to frame 10 through a bracket 26. A conventional load spring 28 and shock absorber 30 are suitably interposed between the lower wishbone 16 and frame 10.

The knuckle bracket designated generally 32 comprises a spindle 34 and a boss portion 36. The interior of boss portion 36 and the exterior of king pin 12 are correspondingly threaded to provide a bearing of the threaded type between them. Lubricant introduced between the bracket 32 and king pin 12 through the illustrative lubricant fitting 38 is retained by the upper packing gland 40 and enclosing cup 42, and a corresponding lower packing gland 44.

In accordance with the present invention the boss portion 36 of knuckle bracket 32 is slotted at 46, the slot extending longitudinally of the boss portion 36 from the upper end as viewed in Figure 1 to substantially the mid portion of the boss portion. A compressible gasket 48 is preferably disposed within slot 46 to prevent the escape of lubricant therethrough. A transverse tightening stud 50 is provided which passes through ears formed on opposite sides of the slot 46, and forms a convenient means of restricting slot 46 to take up any play which may develop in the bearing.

It will be observed that with the relationship of parts as shown in Figure 1, the slot 46 is formed in the boss portion of bracket 32 at a point through which the normal loads are not transmitted. It will be understood that in operation, the load transmitted between the king pin 12 and bracket 32 tends to cause counter-clockwise rotation of bracket 32, as viewed in Fig. 1, so that the right hand upper portion of boss portion 36, and the left hand lower portion thereof, as viewed in Figure 1, are forced into engagement with king pin 12. No substantial pressure is transmitted, however, through the upper left hand portion of boss 36, in which portion the slot 46 is formed.

It will also be understood that the adjusting operations for which adjusting stud 48 is provided are those of maintaining a correct bearing fit between knuckle bracket 32 and king pin 12, such as will permit relatively free rotation of the former about the latter as an axis, and that it is not contemplated that stud 48 will be tightened to such extent as to interfere with such rotatable action.

The alternative construction illustrated in Figures 3 and 4 has the same operating characteristics as the embodiment shown in Figures 1 and 2, and illustrates the applicability of the slotted type of threaded bearings to applications other than king pin and knuckle bearing connections. In Figures 3 and 4 the bracket 60 represents a pivotal connection between the vehicle frame and the tie rod which connects the steering arms associated with the knuckle brackets on both front wheels of a vehicle. In Figure 3, bracket 60 is threadably associated with a threaded axis 62, the opposite ends of which are secured in the arms 64 of a bracket the connecting arm 68 of which is suitably riveted by rivets such as 70, to the supporting frame member 72.

In operation, the parts connected to bracket 60 tend to cause clockwise rotation thereof with respect to axis 62, as viewed in Figure 3, and the load is thus transmitted between the upper left hand portion and the lower right hand portion thereof. Accordingly, the adjusting slot 74 is cut in bracket 60 in the upper right hand portion thereof, which region is relatively free of load pressures. As in the first described embodiment, a gasket 76 is preferably interposed in the slot. As shown in Figure 4, the adjusting stud 78 passes through openings 80 formed in the bracket 60 to effect the tightening of the joint.

From the foregoing, it will be seen that the slotted construction of a threaded bearing member is effected without danger of introducing shoulders and irregularities in the bearing member which would interfere with the proper bearing action, and at the same time, affords a readily adjusted and simple means of maintaining the threaded bearing connections free of play.

Although specific embodiments of the present invention have been described, it will be evident that various changes may be made in the described form within the spirit and scope thereof, as defined in the appended claims.

What is claimed is:

1. In combination, inner and outer members connected together to form a threaded bearing adapted to transmit loads which tend to longitudinally tilt one member relative to the other, which tilting defines a first major load area along one inner face of said outer member adjacent one end thereof and a second major load area along the opposite inner face adjacent the other end thereof, said inner member having external threads, said outer member having internal threads which mate with said external threads to form a rotatable threaded bearing connection between them, said outer member having an adjustable split therein which is located outside of said first and second major load areas, said outer member being continuous and unsplit throughout both said major load areas, said split being adjustable to take up wear in said bearing.

2. In combination, inner and outer members connected together to form a threaded bearing adapted to transmit loads which tend to longitudinally tilt one member relative to the other, which tilting defines a first major load area along one inner face of said outer member adjacent one end thereof and a second major load area along the opposite inner face adjacent the other end thereof, said inner member having external threads, said outer member having internal threads which mate with said external threads to form a rotatable threaded bearing connection between them, said outer member having an adjustable split which extends longitudinally thereof along said one face from said other end but terminates outside of said first load area, said outer member being continuous and unsplit throughout said first and second major load areas, said split being adjustable to take up wear in said bearing.

JOHN W. LEIGHTON.